United States Patent Office 3,088,803
Patented May 7, 1963

3,088,803
METHOD OF SEPARATING METAL VALUES FROM AMMONIACAL SOLUTIONS
Vladimir Nicolaus Mackiw and Vasyl Kunda, Fort Saskatchewan, Alberta, and Robert Lucien Benoit, Ste.-Foy, Quebec, Canada, assignors to Sherritt Gordon Mines Limited, Toronto, Province of Ontario, Canada, a company of Ontario
No Drawing. Filed Mar. 11, 1959, Ser. No. 798,597
Claims priority, application Canada Mar. 11, 1958
4 Claims. (Cl. 23—134)

This invention relates to a method of precipitating values of metals which form insoluble sulphides more readily in ammoniacal solution than nickel. The invention is particularly directed to the treatment of ammoniacal solutions which contain dissolved salts of at least one of the metals of the group consisting of nickel and cobalt and values of at least one other metal which forms an insoluble sulphide more readily in ammoniacal solution than nickel and elemental sulphur in at least the stoichiometric equivalent of the other metals present as sulphides.

Hydrometallurgical processes for the extraction and recovery of metals such as nickel, copper and cobalt are becoming relatively well known in the metallurgical and chemical arts and are being employed successfully on a commercial scale. Such processes involve leaching the mineral sulphides with an acid or alkaline leach solution, preferably at elevated temperature and pressure, in the presence of a free oxygen bearing gas, such as air, oxygen enriched air or oxygen. The resulting leach solution which contains dissolved salts of the metal or metals of interest is then subjected to treatment for the recovery of desired metal values as product metal or metals substantially free from impurities.

A process for the recovery of the metals nickel, copper and cobalt which is being operated very successfully on a commercial scale involves leaching mineral sulphides which contain values of the metals nickel, copper and cobalt with strong aqueous ammonia in the presence of a free oxygen bearing gas. This leaching method is disclosed in detail in Patent No. 2,576,314. The resulting leach solution contains dissolved values of the metals nickel, copper and cobalt, thiosulphate, polythionates such as trithionate and tetrathionate, ammonium sulphate and ammonium sulphamate.

It has been found that values of metals which form insoluble sulphides more readily than nickel in ammoniacal solution, such as copper values, can be precipitated from this solution by heating the solution and reducing the free ammonia content as described in detail in Patent No. 2,693,404. Residual undesired metal values can be stripped from the solution by replenishing the thiosulphate and/or polythionate ions and continuing the heating until substantially all such metal values have been stripped from the solution as disclosed in Patent No. 2,693,405. The methods described in these two prior patents are particularly applicable to the treatment of ammoniacal leach solutions which contain sufficient polythionate and/or thiosulphate compounds to effect precipitation of at least the major portion of the metal values which form insoluble sulphides more readily than nickel.

The leach solution which contains the dissolved nickel and cobalt values preferably is then treated to convert residual thiosulphate and/or polythionate compounds to sulphate and/or sulphamate compounds leaving a residual solution from which the dissolved nickel and/or cobalt values can be recovered as product metal substantially free from impurities.

The formation and decomposition of thiosulphate and polythionates in ammoniacal solution involve a complex series of reactions. An explanation of the reactions leading to the formation and precipitation of certain metal sulphides is that the various metal values are present in the solution as soluble ammine sulphate. These metal sulphates are formed and maintained in the solution as soluble sulphates despite the presence of compounds which decompose readily to form sulphides in the solution by the strongly oxidizing atmosphere supplied by the free oxygen bearing gas. However, when the leach solution is heated in the absence of the free oxygen bearing gas, thiosulphate and polythionate compounds decompose to sulphides in the presence of cations to produce sulphides of very low solubility. Dissolved metal ions which have a high avidity for sulphide sulphur, such as copper, combine with so-released sulphide ions to form metal sulphides which, being of low solubility in ammoniacal solution, precipitate from the solution.

We have found in leaching metal bearing material which contains desired non-ferrous metal values, such as nickel and/or cobalt, and at least one other metal, such as copper, which forms an insoluble sulphide more readily than nickel, that there are instances in which there are not sufficient thiosulphate and/or polythionate ions present in the leach solution to provide the sulphide ions necessary to combine with the metal ions it is desired to precipitate from the solution. This thiosulphate and/or polythionate deficiency may be the result of a deficiency in the sulphide sulphur content of the metal bearing material, such as in the treatment of a low sulphur matte or speiss, or it may be the result of leaching metal bearing sulphides under conditions in which thiosulphate and/or polythionates formed in the solution are decomposed to soluble sulphates under oxidizing conditions as leaching proceeds.

We have found that the problem of precipitating metals, which form sulphides more readily than nickel in ammoniacal solution, can be solved in the treatment of an ammoniacal solution which is deficient in polythionate and/or thiosulphate sulphur ions by digesting the solution with agitation at a temperature above about 100° F. in a substantially inert atmosphere provided elemental sulphur is present in the solution in at least the stoichiometric equivalent as sulphides of the metal values to be precipitated from the solution.

The method of the present invention is described hereinafter as employed in the treatment of an ammoniacal ammonium sulphate solution which contains free or uncombined ammonia and dissolved salts of nickel, copper and cobalt for the precipitation therefrom of copper as copper sulphite. It will be understood that the method is equally effective in separating from such solution, values of other metals which form insoluble sulphides more readily in ammoniacal solution than nickel. Such other metals include, but are not necessarily limited to, silver, gold, ruthenium, germanium, tungsten, bismuth, platinum, cadmium, rhodium, molybdenum, tin, osmium, vanadium, mercury, palladium, arsenic and antimony.

The improved method of this invention for separating values of metals which form insoluble sulphides more readily than nickel in an ammoniacal solution which contains, in solution, at least one salt of a metal of the group consisting of nickel and cobalt, free ammonia in excess of about 2.0 mols per mol of dissolved nickel plus cobalt, ammonium sulphate, and a salt of at least one metal which forms an insoluble sulphide more readily than nickel in the said solution, comprises, in general, the steps of adjusting the free ammonia content of the solution to within the range of from about 2 to about 4 mols per mol of dissolved nickel plus cobalt, providing in the solution finely divided particles of elemental sulphur in at least the stoichiometric equivalent of that required to combine with the metal values to be precipitated from the solution as sulphides, actively agitating the solution in an inert atmosphere at a temperature above about 100° F., continuing the heating period for a time sufficient to form and precipitate said metal sulphides, and separating precipitated metal sulphides from the solution.

In leaching oxidizable metal bearing material, such as mineral sulphides, matte, and the like which form soluble metal ammines when leached with ammonia in the presence of a free oxygen bearing gas, such as air, oxygen enriched air or oxygen, it is customary to employ a substantial excess of free ammonia in order to obtain maximum rate of metal extraction. For example, in treating a solution which contained about 45 grams per litre nickel in a commercial operation, a free ammonia content of from 90 to 100 grams per litre is maintained throughout the leaching operation. Thus, the pregnant leach solution subjected to treatment by the method of this invention usually contains a substantial excess of free ammonia.

It is known from United States Patent No. 2,693,404 that as this solution is heated and ammonia is released, dissolved values of metals which form insoluble sulphides more readily in ammoniacal solution than nickel, such as copper, are converted to and precipitated from the solution as metal sulphides provided at least one unsaturated sulphur compound of the group consisting of polythionates having more than two sulphur atoms in their molecular structure, such as trithionate and tetrathionate, and thiosulphate is present in the solution in amount at least sufficient to provide the sulphide ions to combine with, for example, the copper ions according to the reaction expressed by the following equations:

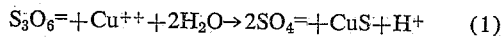

$$S_3O_6^= + Cu^{++} + 2H_2O \rightarrow 2SO_4^= + CuS + H^+ \quad (1)$$

$$S_2O_3^= + Cu^{++} + H_2O \rightarrow SO_4^= + Cu_2S + 2H^+ \quad (2)$$

Metal bearing mineral sulphides which contain sufficient sulphur to combine with desired metal values and form soluble ammine sulphates can be leached in countercurrent to provide, in the resulting leach solution, the unsaturated sulphur compounds necessary for the precipitation of values of metals such as copper.

There is a problem, however, in the treatment of metal bearing material which contains less oxidizable sulphur than that required to combine with desired non-ferrous metals as sulphates. Non-ferrous metal values can be extracted from this type of metal bearing material by employing a leach solution which contains sulphate or sulphamate ions in amount sufficient to provide the sulphur required to combine with the desired non-ferrous metals as sulphates. This leaching method is described in detail in United States Patent No. 2,726,934. The precipitation of values of metals such as copper from a solution which is deficient in unsaturated sulphur compounds such as thiosulphate and polythionates for Reactions 1 and 2 above presents a problem.

This problem can be overcome by adding to the solution finely divided particles of elemental sulphur in amount sufficient to provide a total elemental sulphur content at least equivalent to, and preferably in slight excess of, the amount required to combine with the non-ferrous metal values to be precipitated from the solution as sulphides. The solution is then heated in an inert atmosphere at an elevated temperature, preferably above about 300° F. until precipitation of the lower solubility metal sulphides is substantially complete. The sulphide forming and precipitating reaction is slow below about 300° F. The reaction rate can be increased, however, by providing in the solution a small amount of a polythionate or thiosulphate compound, such as ammonium thiosulphate, to initiate the reaction which proceeds rapidly after initiation. The reaction initiates and proceeds rapidly at temperatures above about 300° F. in the absence of thiosulphate and polythionate compounds in the solution.

The term "bromate value" as used hereinafter in the description of the operation of the method of this invention is intended to mean an empirical measure of the unsaturated sulphur compounds, as hereinbefore defined, present in the solution which are adapted to catalyze the formation of sulphide ions in the presence of elemental sulphur. The bromate value of a solution is the number of millilitres of 0.008 normal bromate solution required to oxidize 5 millilitres of the solution. Thus, for a 5 ml. sample of the solution to be tested:

1 ml. of 0.008 N bromate solution oxidizes—
  0.0192 gram S as trithionate
  0.0146 gram S as tetrathionate
  0.0128 gram S as pentathionate
  0.0118 gram S as hexathionate
  0.0128 gram S as thiosulphate The term "free" ammonia used herein is intended to mean the ammonia which is titratable with sulphuric acid.

The following tables illustrate the operation of the method of this invention.

Table 1 illustrates the effect of the use of varying amounts of sulphur with other operation conditions constant.

Initial solution composition:

Ni _____ 55 grams per litre.
Cu _____ 6 grams per litre.
Co _____ 0.26 gram per litre.
(NH$_4$)$_2$SO$_4$ _____ 300 grams per litre.
Bromate value _____ 60 (by thiosulphate addition).
Temperature _____ 250° F.
Molar ratio of free ammonia to nickel plus cobalt plus copper _ 2.3:1.
Quantity of solution _____ 2000 mls.

*Table 1*

| | Sulphur addition | | | | |
|---|---|---|---|---|---|
| Sulphur:copper weight ratio | Nil | 0.5:1 | 0.75:1 | 1.0:1 | 1.5:1 |
| Time, minutes: | | | | | |
| 15, g.p.l. Cu | 5.8 | 3.1 | 2.7 | 3.4 | 2.8 |
| 30, g.p.l. Cu | 5.5 | 2.3 | 1.6 | 0.6 | 1.3 |
| 30, g.p.l. Cu | 5.0 | 1.9 | 1.1 | 0.4 | 0.5 |
| 60, g.p.l. Cu | 5.1 | 1.6 | 0.9 | 0.05 | 0.035 |
| 75, g.p.l. Cu | 5.1 | 1.2 | 0.5 | 0.013 | Nil |
| 90, g.p.l. Cu | 5.0 | 1.0 | 0.035 | 0.0056 | Nil |
| 105, g.p.l. Cu | 5.0 | 1.0 | 0.0035 | Nil | Nil |
| 120, g.p.l. Cu | 5.0 | 0.8 | 0.0024 | Nil | Nil |
| Final bromate value | Nil | 0.2 | 4 | 10 | 8 |
| Residue analysis, percent: | | | | | |
| Ni | 2.72 | 0.91 | 1.15 | 1.02 | 0.91 |
| Cu | 46.5 | 55.2 | 57.4 | 47.6 | 43.2 |
| S | 24.8 | 34.1 | 32.2 | 45.4 | 46.3 |
| Weight in grams | 4.5 | 19.5 | 20.5 | 22.5 | 21 |

This example illustrates that the addition of from about 0.75 to about 1.5 pounds of elemental sulphur per pound of copper in the solution effects substantially complete precipitation of the copper within a reasonable time period.

Table 2 illustrates the effect of varying the free ammonia content of the solution, other conditions being maintained constant.

Conditions:
Temperature of solution _____ 250° F.
Ratio S:Cu by weight _____ 1.0.
Initial solution composition:
  Cu _____ 6 g.p.l.
  Ni _____ 55 g.p.l.
  $(NH_4)_2SO_4$ _____ 300 g.p.l.
  Co _____ .26 g.p.l.
  Bromate value _____ 60 (by thiosulphate addition).

Table 2

| Variables | Mols $NH_3$ per mol of Ni+Co+Cu | | | | |
|---|---|---|---|---|---|
| | 1.8:1 | 2.3:1 | 3.0:1 | 4.0:1 | 5.0:1 |
| G.p.l. after— | | | | | |
| 15 mins | 3.4 | 2.1 | 2.7 | 3.1 | 4.6 |
| 30 mins | 0.60 | 0.82 | 1.2 | 2.5 | 4.0 |
| 45 mins | 0.22 | 0.20 | 0.4 | 1.6 | 3.3 |
| 60 mins | 0.056 | 0.062 | 0.2 | 1.0 | 2.6 |
| 75 mins | 0.013 | 0.011 | 0.07 | 0.8 | 2.0 |
| 90 mins | 0.005 | 0.003 | 0.07 | 0.52 | 1.5 |
| Final bromate value | 3.9 | 10.0 | 24.0 | 41.0 | 52 |
| Residue analysis, percent: | | | | | |
| Ni | 1.4 | 1.0 | 1.1 | 0.9 | 0.2 |
| Cu | 52.0 | 47.6 | 51.9 | 50.1 | 46.6 |
| S | 39.0 | 45.5 | 40.7 | 38.0 | 46.8 |

It will be noted that a high ammonia content of the solution reduced the rate of copper precipitation and may inhibit substantially complete removal of copper.

The following Table 3 illustrates the effect of adding matte and mineral sulphides to a solution deficient in unsaturated sulphur compounds which produce sulphide ions in the presence of elemental sulphur, as evidenced by the low bromate value. The solution was prepared by leaching matte which contained 61.1% nickel, 5.2% copper, 0.48% cobalt, 21.5% sulphur and 9.0% iron with an ammoniacal-ammonium sulphate leach solution.

Table 3

Conditions:
Temperature of solution _____ ° F__ 275
Ratio of S to Cu by weight _____ 0.75:1
Initial solution composition (matte leach solution):
  Cu _____g.p.l__ 3.2
  Ni _____g.p.l__ 43.0
  $(NH_4)SO_4$ _____g.p.l__ 240
  Co _____g.p.l__ 0.38
  Bromate _____ 1.0

| | Low grade sulphide concentrate 2 g.p.l. | Matte addition | |
|---|---|---|---|
| Addition | | 1 g.p.l. | 2 g.p.l. |
| Cu in solution, grams per litre: | | | |
| 15 mins | 2.7 | 1.9 | 2.0 | 1.2 |
| 60 mins | 2.4 | 0.37 | 0.43 | 0.0074 |
| 75 mins | 2.1 | 0.22 | 0.26 | 0.0030 |
| 90 mins | 1.9 | 0.14 | 0.16 | 0.0011 |
| Final bromate value | .9 | .4 | .3 | .9 |
| Residue analysis, percent: | | | | |
| Ni | 1.0 | 3.6 | 2.7 | 5.3 |
| Cu | 35.4 | 38.9 | 43.8 | 51.1 |
| S | 53.6 | 27.9 | 31.5 | 34.3 |

It will be noted that when conducting the copper precipitation step at 275° F., the addition of elemental sulphur alone had very little effect on the precipitation of copper from a solution having a bromate value of only 1. However, the addition of a very minor amount of mineral sulphides or matte appeared to provide, in the presence of elemental sulphur, the sulphides required to initiate in the reaction.

The following Table 4 illustrates the use of the addition of a small amount of sulphur dioxide in combination with elemental sulphur to provide the sulphide ions necessary for initiating the precipitating reaction at a temperature below 300° F. in a solution having a low bromate value. The experiments were conducted with a constant time of retention and varying sulphur dioxide additions.

Table 4

The experimental conditions were:
Temperature _____° F__ 195
Retention time _____minutes__ 90
Initial copper concentration _____g.p.l__ 4.6
Ammonium sulphate concentration _____g.p.l__ 250
Molar ratio of free ammonia to nickel _____ 2.4:1
Sulphur to copper ratio by weight _____ 0.75:1
Particle size of sulphur, mesh _____ —200
Initial bromate value _____ 0

| $SO_2$, g.p.l. | Cu final, g.p.l. | Copper sulphide residue, percent | | |
|---|---|---|---|---|
| | | Cu | S | Ni |
| 0 | 4.5 | (¹) | (¹) | (¹) |
| 2.5 | 1.0 | 38.1 | 43.6 | 1.58 |
| 5.1 | 0.6 | 51.9 | 43.6 | 0.29 |
| 6.4 | 0.15 | 58.0 | 37.4 | 0.16 |
| 7.6 | 0.074 | 60.9 | 36.0 | 0.16 |
| 10.2 | 0.007 | 66.2 | 28.8 | 0.10 |
| 12.7 | 0.002 | 69.5 | 27.1 | 0.51 |

¹ No precipitation.

This Table 4 illustrates that when there are no unsaturated sulphur compounds in the solution, as indicated by the initial bromate value of zero, no sulphide precipitation is obtained at the temperature of 195° F. even though a 50% excess of elemental sulphur is present over the stoichiometric required to precipitate all the copper. However, when a minor amount of sulphur dioxide is added, sulphide formation and precipitation proceeds rapidly and substantially completely.

The following Table 5 illustrates the manner in which copper is precipitated at varying temperatures with varying amounts of sulphur dioxide to effect substantially complete precipitation of copper.

Table 5

Conditions:
Temperature of solution _____ Variable
Ratio S to Cu by weight _____ 0.75:1
Initial solution composition:
  Copper _____g.p.l__ 4.6
  Nickel _____g.p.l__ 45.0
  Ammonium sulphate _____g.p.l__ 250
  Cobalt _____g.p.l__ 0.4
  Bromate value _____ Nil
Ratio of free ammonia to nickel plus cobalt 2.4:1
Time of treatment _____minutes__ 60
Sulphur particle size, mesh_____ —200
Copper content of final solution _____g.p.l__ 0.02

| Temperature, ° F | 195 | 212 | 230 | 250 | 270 | 290 | 325 |
|---|---|---|---|---|---|---|---|
| Minimum requirement of sulphur dioxide, g.p.l. | 6.16 | 5.11 | 3.85 | 3.2 | 1.8 | .7 | Nil |

The formation and precipitation of metal sulphides proceeds rapidly and is complete when the ammonia content of the solution is within the range of from about 2 to about 4 mols per mol of dissolved metal values. Usually, optimum results are obtained with respect to the rate and efficiency of the extraction of desired metal values by maintaining, during leaching, a high concentration of free ammonia of the order, for example of from 90 to 100 grams per litre. Usually, it is economic to release part of this free ammonia and recover it as such for re-use in the leaching stage by heating the solution at or about its boiling temperature until the free ammonia content has been reduced to a predetermined concentration, for example, to between 2 to 3 mols per mol of nickel plus cobalt if the resulting solution is to be reacted with a reducing gas in a later stage for the production of nickel and/or cobalt as powder metal. It will be understood, however, that the preliminary adjustment of the free ammonia content of the solution is intended to include the adjustment by any practical method, whether in the leaching stage, or by heating, or by the addition of reagents.

The present invention can be employed as a single stage operation to produce nickel and/or cobalt bearing solution from which nickel and/or cobalt can be produced which meets market specifications. The elemental sulphur particles are readily available as "sulphur flour" of which the particles are of the order of 70% minus 200 mesh standard Tyler screen.

The present invention possesses several important advantages. Values of metals such as copper can be reduced to as low as 0.0008 gram per litre, or lower, if desired. This separation can be effected in a single step with minimum co-precipitation of dissolved nickel and/or cobalt values. The method can be applied satisfactorily to solutions which contain nickel and/or cobalt and a relatively high concentration of metal values such as copper.

What we claim as new and desire to protect by Letters Patent of the United States is:

1. The method of separating values of metals which form insoluble sulphides more readily than nickel in an ammoniacal ammonium sulphate solution which contains, in solution, at least one salt of a metal of the group consisting of nickel and cobalt; free ammonia in excess of about 2.0 mols per mol of dissolved nickel plus cobalt, a salt of at least one other metal which forms an insoluble sulphide more readily than nickel and a finite amount of an oxidizable sulphur compound selected from the group consisting of polythionates having more than two sulphur atoms in their molecular structure and thiosulphate but less than that required to provide, on oxidation, sulphur ions in amount sufficient to combine with said first mentioned metal values as sulphides; which comprises the steps of adjusting the free ammonia content of the solution to within the range of from about 2 to about 4 mols per mol of dissolved nickel plus cobalt, dispersing finely divided particles of elemental sulphur in the solution in excess of the amount required to combine with said first mentioned metal values to form metal sulphides, actively agitating the solution in an inert atmosphere at a temperature above about 100° F. to form and precipitate insoluble metal sulphides from the solution, and separating precipitated metal sulphides from the solution.

2. The method according to claim 1 in which the finite amount of the compound selected from the group consisting of polythionates having more than two sulphur atoms in their molecular structure and thiosulphate is formed in the solution by adding thereto at least one member selected from the group consisting of thiosulphate, sulphur dioxide, and mineral sulphides.

3. The method according to claim 1 in which the finite amount of the compound selected from the group consisting of polythionates having more than two sulphur atoms in their molecular structure and thiosulphate is formed in the solution by conducting the metal sulphide forming reaction at a temperature above about 300° F.

4. The method according to claim 1 in which the metal sulphide forming reaction is continued to effect formation and precipitation of the major portion of the dissolved sulphide forming metal values as metal sulphides substantially free from co-precipitation of nickel or cobalt, precipitated metal sulphides are separated from the solution and the reaction is thereafter continued to effect formation and precipitation of substantially all the residual lower solubility metal sulphides.

References Cited in the file of this patent

UNITED STATES PATENTS

| | | |
|---|---|---|
| 1,013,511 | Pipereaut | Jan. 2, 1912 |
| 2,136,376 | Horvath et al. | Nov. 15, 1938 |
| 2,693,404 | Mackiw et al. | Nov. 2, 1954 |
| 2,693,405 | Mackiw et al. | Nov. 2, 1954 |
| 2,726,934 | Forward et al. | Dec. 13, 1955 |
| 2,755,172 | McGauley et al. | July 17, 1956 |
| 2,836,485 | Schaufelberger et al. | May 27, 1958 |
| 2,913,335 | Dean | Nov. 17, 1959 |